(12) United States Patent
Tonogai et al.

(10) Patent No.: US 10,972,504 B2
(45) Date of Patent: Apr. 6, 2021

(54) DEVICE MANAGEMENT USING A SECONDARY CELLULAR DATA CONNECTION

(71) Applicant: LATTICE HEALTH SYSTEMS, INC., Austin, TX (US)

(72) Inventors: Dale Tonogai, Los Altos, CA (US); Pramod Madabhushi, Austin, TX (US); John Michael Adriance, Austin, TX (US)

(73) Assignee: LATTICE HEALTH SYSTEMS, INC., Austin, TX (US)

(*) Notice: Subject to any disclaimer, the term of this patent is extended or adjusted under 35 U.S.C. 154(b) by 189 days.

(21) Appl. No.: 15/398,349

(22) Filed: Jan. 4, 2017

(65) Prior Publication Data

US 2017/0196040 A1    Jul. 6, 2017

Related U.S. Application Data

(60) Provisional application No. 62/275,205, filed on Jan. 5, 2016.

(51) Int. Cl.
| | |
|---|---|
| H04L 29/06 | (2006.01) |
| H04W 48/08 | (2009.01) |
| H04W 88/06 | (2009.01) |
| H04W 84/12 | (2009.01) |
| H04W 84/04 | (2009.01) |
| H04W 48/18 | (2009.01) |

(52) U.S. Cl.
CPC .............. *H04L 63/18* (2013.01); *H04W 48/08* (2013.01); *H04W 48/18* (2013.01); *H04W 84/042* (2013.01); *H04W 84/12* (2013.01); *H04W 88/06* (2013.01)

(58) Field of Classification Search
CPC ...... H04L 63/18; H04W 76/16; H04W 48/08; H04W 48/18; H04W 84/12; H04W 84/042; H04W 88/06
See application file for complete search history.

(56) References Cited

U.S. PATENT DOCUMENTS

| | | | | |
|---|---|---|---|---|
| 2011/0167133 A1* | 7/2011 | Jain | .................... | H04L 67/12 |
| | | | | 709/219 |
| 2013/0007853 A1* | 1/2013 | Gupta | ................... | H04W 76/10 |
| | | | | 726/5 |
| 2013/0279370 A1* | 10/2013 | Eitan | ..................... | G01S 5/0231 |
| | | | | 370/254 |

(Continued)

*Primary Examiner* — Un C Cho
*Assistant Examiner* — Yu-Wen Chang
(74) *Attorney, Agent, or Firm* — Tarolli, Sundheim, Covell & Tummino LLP

(57) ABSTRACT

A device is capable of connecting to both a WLAN and a cellular data network. Preference is given to using the WLAN. However, prior to connecting to the WLAN, the cellular data network is used to connect to a remote portal from which the device receives parameters to connect to the WLAN. The portal initiates prompts to receive the WLAN parameters that it provides to the device. Upon successfully connecting to the portal the device deactivates the cellular data connection. Upon there being network path errors on the preferred network connection, the device is capable of activating the secondary cellular data connection to the portal to report errors.

26 Claims, 6 Drawing Sheets

(56) References Cited

U.S. PATENT DOCUMENTS

| | | | |
|---|---|---|---|
| 2014/0071967 A1* | 3/2014 | Velasco | H04L 12/1403 370/338 |
| 2014/0161113 A1* | 6/2014 | Cui | H04W 12/06 370/338 |
| 2014/0181515 A1* | 6/2014 | Yang | H04W 12/06 713/168 |
| 2014/0215590 A1* | 7/2014 | Brand | H04L 67/1097 726/6 |
| 2014/0295825 A1* | 10/2014 | Chuang | H04W 24/04 455/425 |
| 2015/0333965 A1* | 11/2015 | Lee | H04L 12/4625 370/254 |
| 2016/0315810 A1* | 10/2016 | Francescangeli | H04L 41/0806 |
| 2018/0191741 A1* | 7/2018 | Dawes | H04L 63/1408 |

* cited by examiner

DEVICE MANAGEMENT USING A SECONDARY CELLULAR DATA CONNECTION

CROSS-REFERENCE TO RELATED APPLICATIONS

This application claims the priority of U.S. Provisional application 62/275,205, filed on Jan. 5, 2016 and entitled METHOD AND SYSTEMS FOR DEVICE MANAGEMENT USING A SECONDARY CELLULAR DATA CONNECTION, the contents of which is incorporated herein by reference in its entirety.

TECHNICAL FIELD

Systems and methods for device management using a secondary cellular data connection are disclosed.

BACKGROUND

Increasing numbers of devices are being deployed on home networks by users with little networking or computer expertise. Many such devices do not have a keyboard or display, yet the device may require certain configuration information in order to access the local network. For example, in order to access a WLAN (Wireless LAN) a device must be configured with the service set identifier (SSID) of the network so that it accesses the proper network. Moreover, it is prudent for WLANs to be secured, yet this requires devices to be configured with the network's password.

Even after they are configured and the device successfully connects to the WLAN, challenges remain for the deployment of these networked devices. There may be various network errors, sometimes as simple as the local network going down. In another example, the local network may remain up, but the device may suddenly find that it cannot access the network. In yet other examples, the connection to the internet may be down or a remote server itself may be down.

Due to increasing number of devices being deployed and also their increased importance, there is a continuous desire for methods that ease their deployment and management.

SUMMARY

Example embodiments described herein provide methods and systems for device management using a secondary cellular data connection.

One example method is provided for a portal (a cloud based management server) to provide parameters to a device for connecting to a WLAN. The WLAN is remote to the portal, such that the WLAN is not directly accessible by the portal. The portal is configured with parameters, including at least one of a WLAN service set identifier (SSID) and a WLAN password, for the device to use in connecting to the WLAN. The portal sends the parameters to the device to use in connecting to the WLAN.

Another example method is provided for a device to activate a connection to a WLAN. The device uses a cellular data connection to receive parameters, comprising at least one of a WLAN SSID and a WLAN password, from a portal. The device is local to the WLAN, such that the WLAN is visible to the device. However the portal is at a remote location, such that the WLAN is not visible to the portal.

Another example method is provided for a device to resolve a network path error. Upon detecting a network path error to a portal on a preferred network connection, the device establishes a connection to the portal on a secondary cellular data connection. The device reports the error to the portal on the secondary cellular connection and monitors the preferred network connection. Upon the connection being reestablished on the preferred network connection, the device deactivates the secondary network connection.

DETAILED DESCRIPTION

This disclosure relates to the use of a secondary cellular data connection by a device to simplify the device accessing and using a preferred network connection. The secondary cellular data connection is also of use in resolving network access and connectivity problems.

Figure 1:
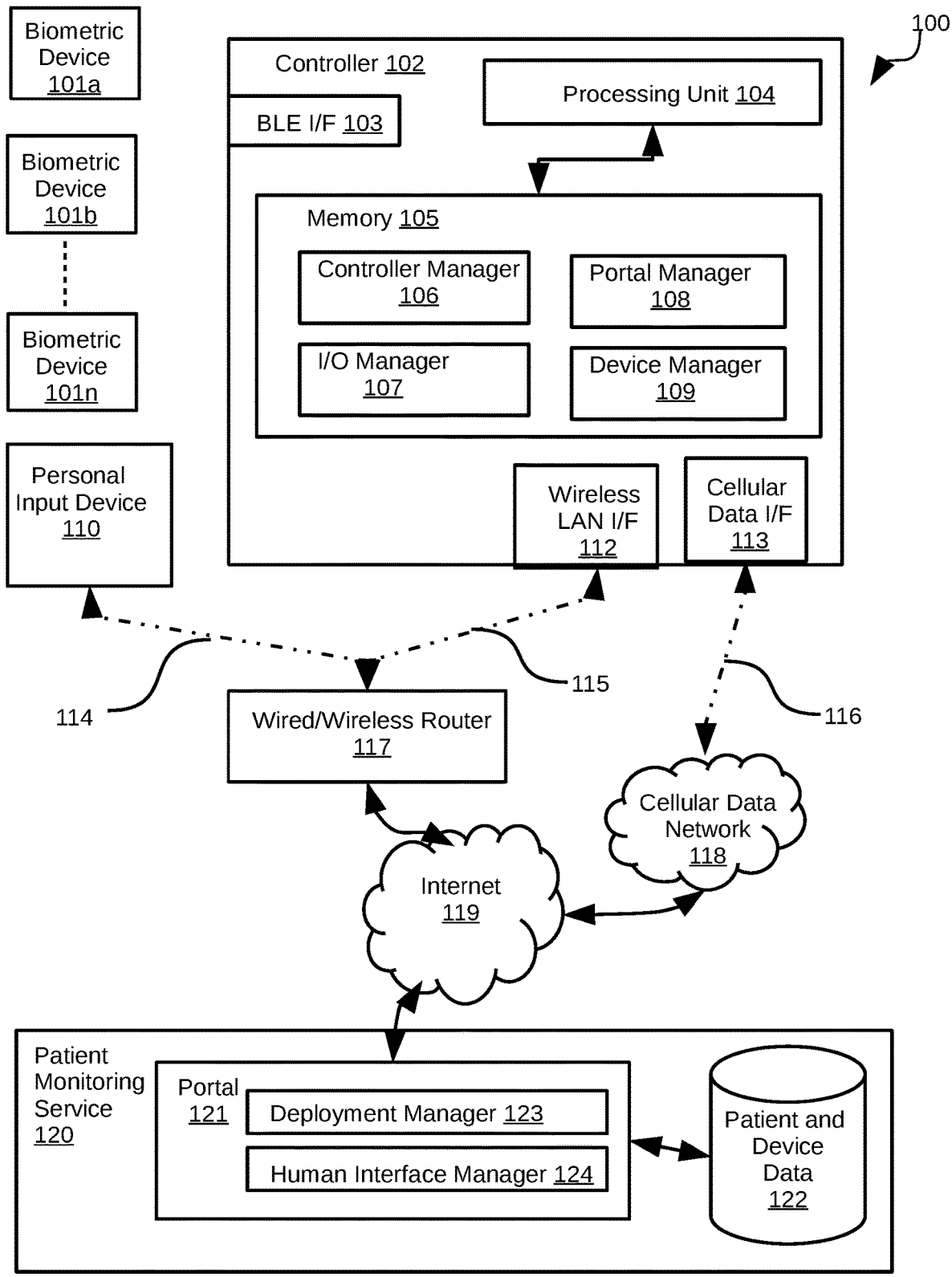
FIG. 1 is a simplified schematic showing a deployment of the present invention.

FIG. 1 illustrates an example deployment and components of the invention described in this disclosure. Controller 102 is a device embodying the invention, enabling it to utilize a local wireless local area network (WLAN) for its preferred network connection. Portal 121 is a cloud based management server, which utilizes controller 102 in providing a service—in the illustrated example the service is patient monitoring service 120. Controller 102 is remote to portal 121. Controller 102 has access to a local WLAN, but this WLAN is not visible, nor directly accessible, to portal 121. Typically, WLANs only have ranges of up to a few hundred feet, though they are sometimes extended to larger areas.

Controller 102 has at least two network interfaces. For example, in FIG. 1 it includes wireless LAN interface 112, which is used to access the local WLAN. The local WLAN is provided by the wired/wireless router 117—line 115 is dashed to indicate that the connection from the WLAN interface 112 to the wired/wireless router 117 is wireless. The controller is able to access the internet 119 through router 117. Cellular interface 113 allows the controller to access a cellular data network 118, which provides an alternative network path to internet 119.

As a further example, controller 102 includes BLE (Bluetooth Low Energy) interface 103, providing it wireless connectivity to any number of biometric devices (101*a* to 101*n*) and allowing it to collect patient biometric readings from these devices, which may be relayed by the controller 102 to portal 121 and then analyzed and reported on by patient monitoring service 120. Biometric readings may include, for example, weight, blood pressure, heart rate, glucose levels, exercise data, sleep data and other readings. It will be appreciated that other wireless technologies may be utilized to interface with biometric devices. While the example controller 102 is a patient monitoring controller, wirelessly collecting data from biometric devices, in other examples, there are embodiments of the invention with other capabilities. For example, a controller may collect data itself—one example would be a digital scale apparatus that embodies the controller. Such a digital scale apparatus may or may not also include the ability to collect data from other biometric devices. Another example is a patient medication adherence apparatus embodying the controller—such an apparatus monitors and guides, in conjunction with a cloud service, a patient in adhering to their medication schedule. Controller capabilities provided in this disclosure through the use of a secondary cellular connection, such as those to simplify access to a preferred network and to resolve problems with preferred network access, are important for these example devices and numerous other example embodiments.

Controller 102 includes a number of modules such as controller manager 106, portal manager 108, input/output (I/O) manager 107 and device manager 109 that are stored in memory 105 and executed by a processing unit 104 that is coupled to the memory for accessing data and executed instructions stored therein. The memory 105 can include an arrangement of system memory and additional memory devices, such as including a hard disc drive, removable storage media, read-only memory (ROM) and random access memory (RAM).

Controller manager 106 manages core controller functions. For example, the controller utilizes the wireless LAN interface 112 to connect to a WLAN so that the controller can utilize it, when available, as the preferred network connection. It also interfaces with cellular data interface 113 to utilize the cellular data network as a secondary connection, enabling controller 102 to communicate with portal 121 even when it is not able to do so using wireless LAN interface 112. Controller 102 is provisioned, prior to being shipped for deployment at a patient's home, with the ability to use cellular data interface 113 to successfully access wireless cellular data network 118. For example, controller 102 may include an embedded subscriber identification module (SIM) card. No further configuration of the controller is necessary by the patient for the controller to access the cellular data network 118.

Portal manager 108 connects to portal 121. It is responsive to commands received from portal 121 and relays patient biometric data to portal 121. Additionally, portal manager 108 sends alerts to portal 121 for certain conditions, such as controller 102 being unsuccessful in using wireless LAN interface 112 to communicate with portal 121.

I/O manager 107 controls user interfaces on controller 102 such as any displays, speakers, and/or light-emitting diodes (LEDs). The I/O manager 107 may be directed by other components utilizing these interfaces. For example, controller manager 106, portal manger 108, or device manager 109 may direct I/O manager 107 to play a prompt on the speaker.

Device manager 109 interfaces with any number of local devices, such as biometric metric devices 101a to 101n. The device manager 109 receives, for example, biometric data from the devices and, after doing any local processing, provides it to portal manager 108 for delivery to portal 121. When requested, the device manager may also alert other components in regard to devices it is aware of. For example, controller manager 106 may request to be notified when biometric devices are activated so that controller manager 106 can direct I/O manager 107 to play prompts at particular times to guide the patient.

FIG. 1 also shows personal input device 110, which is a device used by the patient, or another authorized user, to provide information to portal 121. This will be further described in the methods later outlined in this disclosure. For example, personal input device 110 is any device on which a user can provide web or other forms of input, including, for example, a laptop computer, desktop computer, tablet computer, smartphone or a feature phone. Many such personal input devices will access the internet through wired/wireless router 117. Line 114 is dashed to illustrate a WLAN connection, but some devices may use a wired connection to the router or use other means of connectivity.

Turning now to patient monitoring service 120 of FIG. 1, which is a cloud based service to monitor patients. Some components of the patient monitoring service 120, related to this disclosure, are illustrated including portal 121, which provides interfaces to the service. Portal 121 includes deployment manager 123, which interfaces to devices, such as controller 102, installed, for example, at patients' residences. Deployment manager 123 collects patient data for analysis and reporting to the patients themselves or others (such as their health care provider or caregiver). In addition to collecting data from controller 102, as will be described further in the methods outlined in this disclosure, deployment manager 123 manages the controller and its network connectivity.

Portal 121 also includes human interface manager 124, which provides interfaces for the configuration and management of the system and its components, as well as interfaces for the presentation of patient monitoring data and reports. For example, human interface manager 124 may provide simple interfaces for a patient to provide configuration information, such as parameters for connecting controller 102 to a WLAN. Such an interface may be in the form of a web page that the patient accesses from personal input device 110. Other patient interfaces may also be provided, such as a page for a patient to view their own biometric data and/or an analysis of such data. Human interface manager 124 provides additional interfaces, such as administrative interfaces that may be used to monitor and manage controller status, network connectivity, patient data, device data, the operational state of analysis and the like. Interfaces for caregivers or healthcare providers are other examples of interfaces provided by the human interface manager, allowing authorized individuals to view patient data and/or an analysis of such data. In some cases these interfaces may also provide certain management capabilities, such as, for example, allowing an individual other than the patient to provide parameters for controller 102 to connect to the WLAN.

In addition to portal 121, the patient monitoring service 120 stores data, as illustrated by patient and device data 122. Patient and device data 122 is provisioned when subscriptions are made to the service. For example, patient data may include the identity of the patient, what they will be monitored for, who is authorized to receive reports or alerts based upon the patient monitoring, the means by which alerts should be generated, and the like. The data also includes device information, such as the controller that has been provided to the patient for deployment in their home and the capability or identity of biometric devices that will be used to collect patient data.

Figure 2:
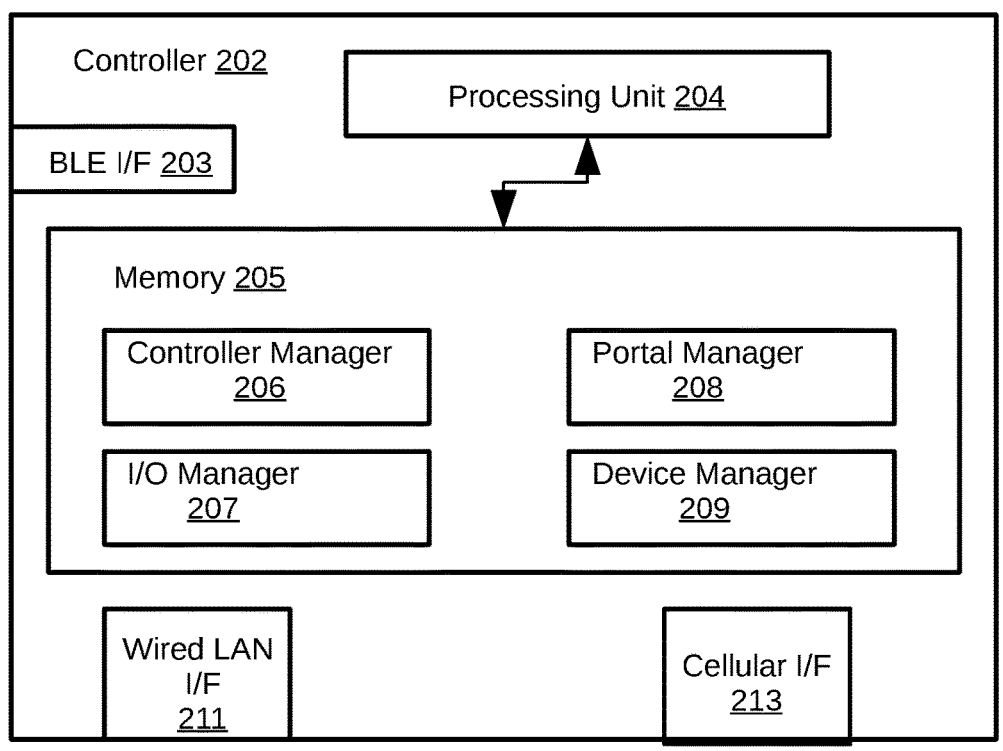
FIG. 2 shows a simplified schematic of a device embodying the present invention, the device having a wired and a cellular interface.

FIG. 2 illustrates a second example embodiment of a controller. Controller 202 is similar to controller 102, with one notable exception—it has wired LAN interface 211 rather than the comparable wireless LAN interface 112 of controller 102. Controller 202, like controller 102, has cellular data interface 213 to provide a secondary cellular data connection. The wired LAN interface provides the preferred network connection of controller 202. As described in the methods later outlined in this disclosure, the secondary cellular data connection can aid in resolving network connectivity problems, including a controller with only a wired LAN interface like that of controller 202.

Figure 3:
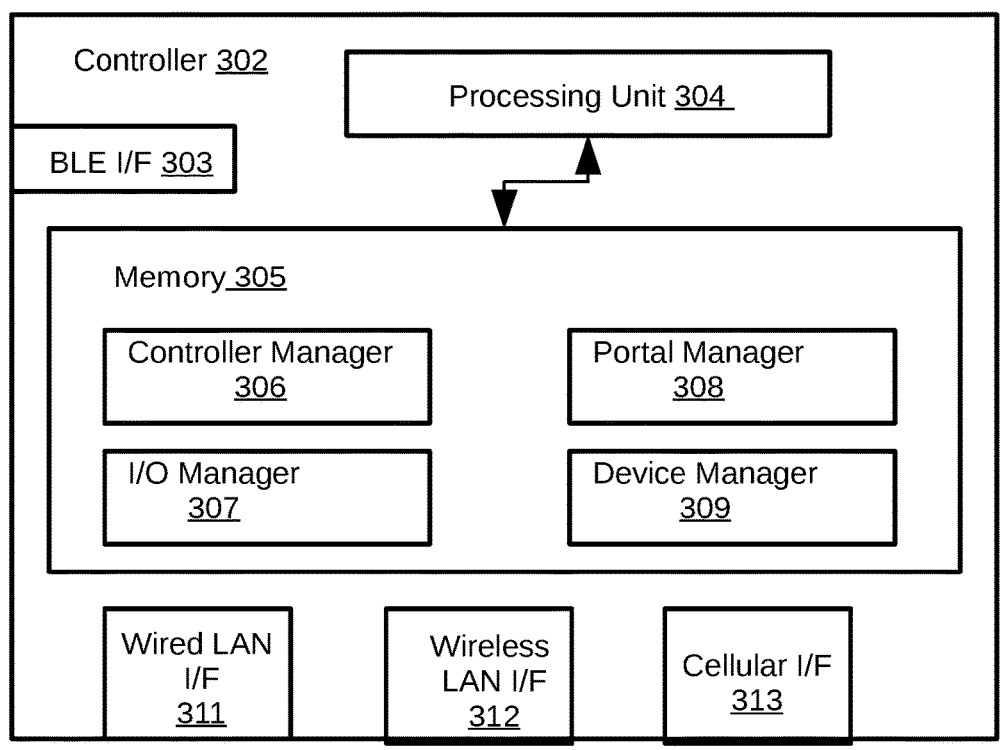
FIG. 3 is a simplified schematic of another device embodying the present invention, the device having both wired and WLAN interfaces, as well as a cellular interface.

FIG. 3. Illustrates a third example embodiment of a controller. Controller 302 has both wired LAN interface 311 and wireless LAN interface 312, along with cellular data interface 313. In this example embodiment, also, the secondary cellular data connection can be utilized in a beneficial fashion, as will be apparent in the discussion of the disclosed methods.

Controller devices, such as examples 102, 202, and 302 shown in FIGS. 1-3 or the patient monitoring service 120 of FIG. 1, typically include familiar software and hardware components, only some of which have been illustrated. For example, they may include operating systems, processors, local memory for storage, I/O devices, and system buses interconnecting the hardware components. RAM and disk drives are examples of local memory for storage of data and computer programs. Other types of local memory include magnetic storage media, optical storage media, flash memory, networked storage devices, and the like. The patient monitoring service 120, including portal 121, may comprise multiple servers and databases.

Figure 4:
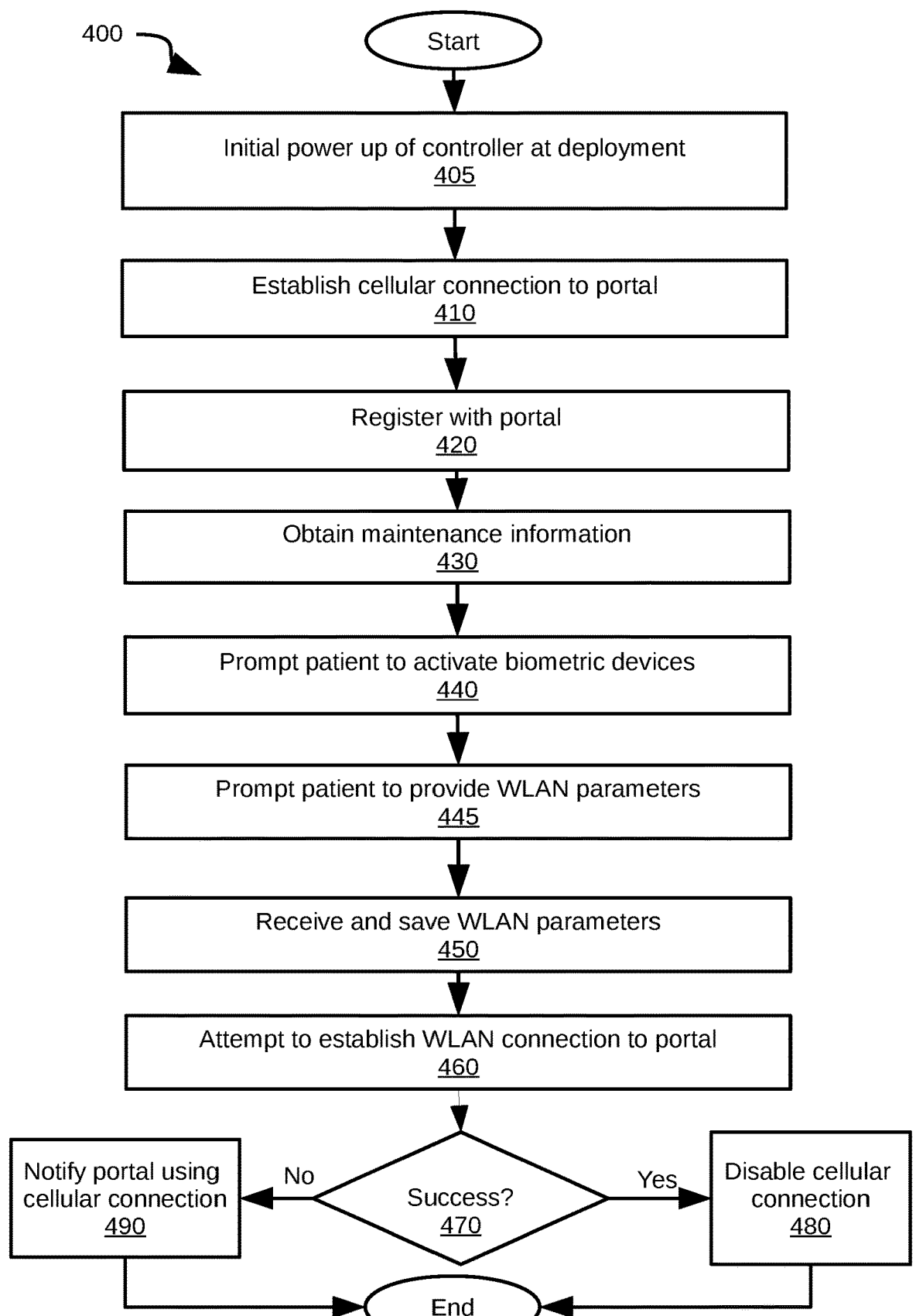
FIG. 4 is a flowchart illustrating an exemplary method for bringing up a controller embodying the present invention.

FIG. 4 is a flowchart 400 illustrating an example of the initial bring up of a controller embodying the present invention. The method starts with 405 the initial power up of the controller (one of the earlier example controllers 102, 202 or 302). At 410 the controller utilizes the cellular data interface to establish a connection to portal 121. As noted earlier, the controller is provisioned prior to shipment so that the cellular data network can be accessed when the controller is first powered on at the patient's home. The controller may be provisioned, prior to shipping to the patient for deployment, with a DNS name of the portal so that it can dynamically determine the portal's IP address.

Upon establishing, using a secondary cellular connection, a connection to the portal 121, at 420 the controller registers with the portal, which may include sending the identity of the controller, device credentials, or other information that the device is expected to provide to the portal. In one example embodiment, even though it may not yet have parameters such as a service set identifier (SSID) or password to access any WLANs, the controller may utilize its wireless LAN interface to collect information about WLANs locally visible to the controller and then send this information to portal 121 (at registration time or at other times). The WLAN information may include, for example, the networks' SSIDs and signal strength.

At 430 the controller receives initial information from the portal. This may include, for example, a maintenance port and credentials for an SSH tunnel that will be utilized for maintenance activities. In some example embodiments, at 440 the controller may play a prompt to activate biometric devices (such as, for example, 101). The controller may have been previously configured to play the prompt or it may receive a message or messages from portal 121 instructing it to play one or more prompts instructing the user to enable and/or take readings from biometric devices they have been provided. The prompt played by the controller may be in the form of a message played on a speaker, a message shown on a display, or by other means. As each biometric device is activated the controller sends an indication of activation along with a new reading to the portal 121. In some example embodiments, any biometric data may be stored and sent later, once the controller has a connection to portal 121 on its preferred network connection, so as to minimize the expense of using the secondary cellular data connection.

In some example embodiments, at 445 the controller prompts the user to provide parameters for the controller to connect to the WLAN. The controller may be programmed to issue the prompt based upon the user's actions with respect to biometric devices. For example, the controller may be configured to not issue the prompt for WLAN parameters until all the expected biometric devices provided to the user have been activated. The controller may have been configured with a list of all the expected biometric devices prior to being shipped to the customer or, in another example, it may receive such a list of expected devices from portal 121. One benefit of delaying the prompt until all the biometric devices are activated is that it allows the user to focus on that task without interruption. However, eventually the controller may issue a prompt after a timeout period, even if the user does not activate all of the biometric devices. In another example, rather than determining when to issue the prompt, the controller simply issues the prompt when directed to do so by portal 121. However, one advantage of making its own determination is the potential to minimize traffic on the secondary cellular connection. In some cases, portal 121 may already have provided WLAN parameters to the controller such that prompting is not necessary. They may have already been configured in advance by an administrator or by the patient entering the WLAN parameters, via portal 121's web interface, even before installing their controller. In such cases, the controller can download WLAN parameters when it is first powered on by the patient. If the parameters work, such that the controller is able to use the preferred network connection, no prompting is necessary.

As previously noted, the prompt may be in the form of a message played on speaker, a message shown on a display, or by other means. Since, in examples 100, 200 and 300 the controller does not have a keyboard, the prompt directs the user to provide the WLAN parameters using a personal input device 110. The prompt may direct the user to a particular URL for a web page provided by portal 121 that collects the parameters. Or the prompt may remind the user to look elsewhere for the URL, such as on a "Quick Start Guide" included in the package containing the controller and biometric devices shipped to the user.

At 450, using the secondary cellular data connection, the controller receives, from portal 121, WLAN parameter information to be used by the controller in connecting to a local WLAN. Such information may, for example, include the SSID and password of the WLAN. The controller stores this information in non-transitory memory so that it can retrieve it locally, when needed, without contacting portal 121 on the secondary cellular data connection. At 460 the controller utilizes the WLAN parameter information to attempt to establish a connection to the local WLAN and then it connects to portal 121 using the local WLAN. At 470 it checks whether it was successful. If so, it continues to 480 and disables the secondary cellular connection. This is done to eliminate the now unnecessary expense of sending cellular data. However, if it was unsuccessful the method continues to 490 where it uses the secondary cellular connection to provide information about the error to the portal. This allows the portal to alert an administrator who may be able to correct the error.

Figure 5:
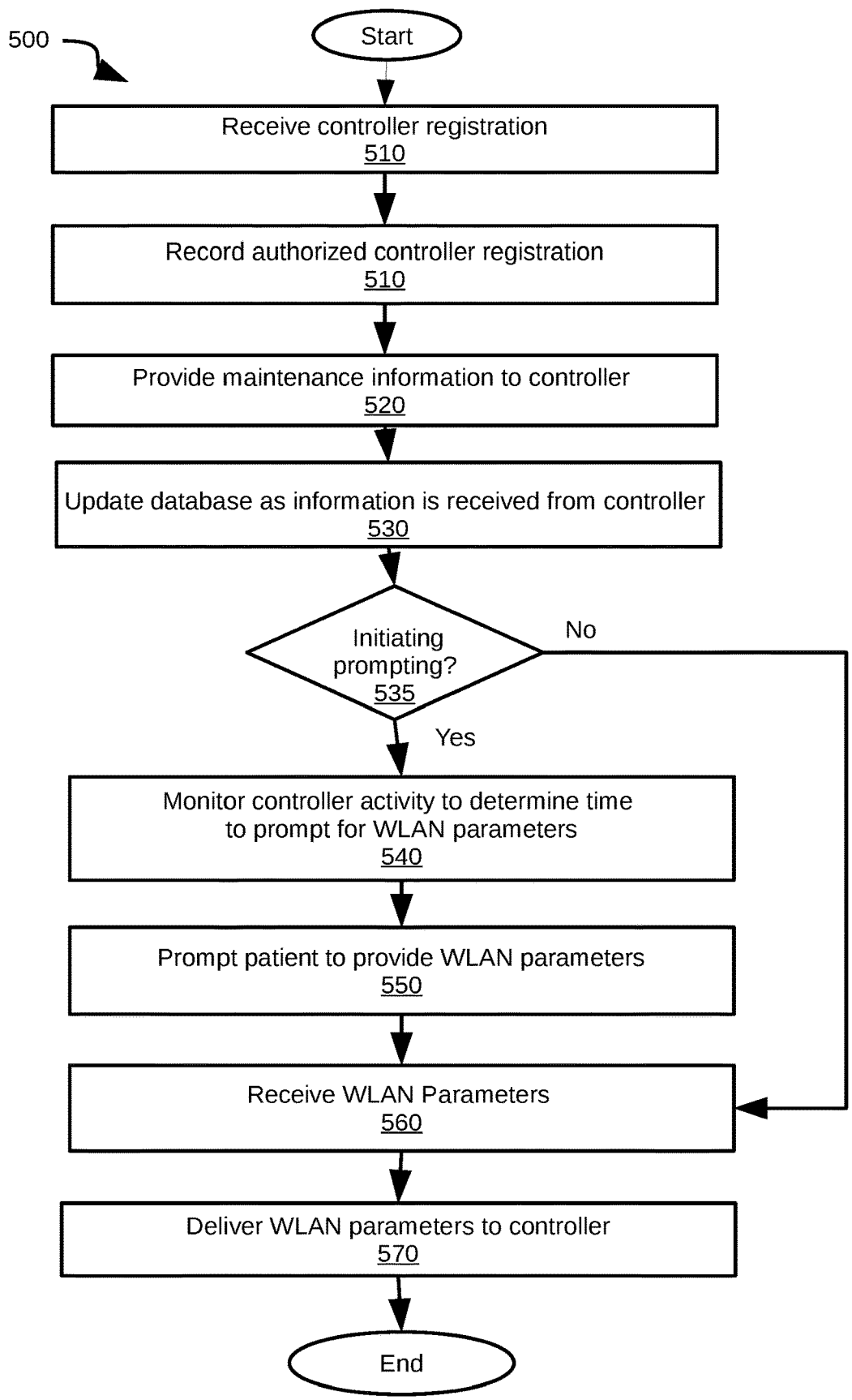
FIG. 5 is a flowchart illustrating an exemplary method of portal collecting WLAN parameters and then providing these parameters to a controller to access the WLAN.

FIG. 5 flowchart 500 illustrates an exemplary method of a portal, such as 121 of FIG. 1, collecting WLAN parameters and then providing these parameters to a controller to access the WLAN. Through this method, portal 121 collects WLAN parameters and provides them for a controller to access a WLAN, even though the WLAN is not directly accessible, nor visible, to the portal. At 510 the portal receives registration information from a controller, such as controller 102 or 302 in FIGS. 1 and 3. At 510 the portal determines if the controller is authorized to use the service. If the controller is authorized, the portal may update its database to record the fact that the controller is now registered and continue to 520 where it provides maintenance information to the controller. This may include, for example, a maintenance port and credentials for an SSH tunnel that will be utilized for maintenance activities, such as remote log in to controller for debugging purposes etc., including software and firmware updates.

At 530, as information is received from the device, the portal 121 updates patient and device data 122. For example, controller 102 may send the portal 121 an indication that a biometric device (such as 101a to 101n in FIG. 1) has been activated and/or send a biometric reading from such a device to the portal.

At 535, different paths are taken depending upon whether the portal itself is initiating any prompts for the patient to enter WLAN parameters. In some example embodiments the controller itself may make a determination as to when to prompt the patient to provide parameters. In that case, the portal is not initiating prompting so the method continues at 560, which will be described shortly. Otherwise, the method continues to 540.

When portal 121 is initiating prompting, at 540 the portal 121 monitors the controller's activity to determine a time to prompt for WLAN parameters to provide the controller. In some example embodiments portal 121 waits, to initiate a prompt, until after it has received an indication from the controller for each of the biometric devices the patient is expected to activate. This is accomplished by keeping records of controllers and their associated biometric devices and patients in database 122. The database 122 can initially be populated when controller is shipped to a patient. Waiting for all of the biometric devices to be activated may be beneficial in allowing the patient to complete activation of all the biometric devices before moving to another room where they will use their personal input device 110 to provide WLAN parameters. For example, a desktop PC in an office may be where the device the patient will enter WLAN parameters, but they may deploy the controller and biometric devices in their bedroom. In some example embodiments, portal 121 may only wait a limited period of time for all biometric devices to be activated—if a configured time limit is reached it may initiate a prompt regardless of whether the devices have been activated.

At 550 the portal 121 initiates a prompt to the patient to provide WLAN parameters. The prompt may direct the user to provide the WLAN parameters using a personal input device 110 by directing the user to a particular predetermined URL for a web page provided by portal 121 that collects the parameters. Or the prompt may remind the user to look elsewhere for the URL, such as on a "Quick Start Guide" included in the package containing the controller and biometric devices that were shipped to the user. The prompt is made using one or more of a variety of mechanisms. For example, portal 121 may signal the controller to issue a prompt in the form of a message played on speaker, a message shown on a display, or by other means. In another example, the portal may send one or more emails or text messages to previously configured patient or caregiver contacts that include a URL directing the reader to a web page where they then provide WLAN parameters, such as the SSID and password, for the WLAN at their home or other location where they are deploying the controller and biometric devices. Some example embodiments may use email or text as an additional form of prompting after issuing a prompt by other means—for example, following a timeout after the initial prompt. If the user is at the controller deployment location when they go to the page and they are using a personal input device 110 with WLAN capabilities it may be possible to aid them. For example, in some cases it may be possible, depending upon permission settings, to direct the user to run a program that will assist in collecting WLAN parameters. The program reads from a known storage location on the personal input device, such as the personal input device's registry, the WLAN SSID and password that the personal input device is currently using to access the network. When the user is running the program at the same location as controller 102, typically their home, there is a high probability that the WLAN the personal input device is using is also the WLAN that the controller should be directed to use. Even if it is not possible to read currently used network parameters, it may still be possible to aid the patient by using the personal input device's WLAN interface to collect a list of WLANs that are visible at the location and, possibly, other information, such as the strength of each WLAN's signal. The prompt initiated by the portal may encourage the patient to use a personal input device with WLAN capabilities, such as a tablet or laptop computer, so that assistance can be made in one of these, or similar, manners that take advantage of the personal input device's WLAN capabilities. Alternatively, in some example embodiments the controller itself may collect the information about locally visible WLANs and, using a secondary cellular data connection, provide it to portal 121 as part of its registration information or at other times. The portal can then use this information to aid the patient when they visit the page to provide WLAN parameters. One advantage of the portal providing information from the controller is that the list can even be provided when the user is on a personal input device without WLAN capabilities, such as a desktop computer that uses a wired LAN interface.

In some examples, the prompt may be made by a representative of patient monitoring service 120 calling the patient and walking them through the process of providing the WLAN parameters. The representative may direct the patient to a web interface to provide the parameters or the agent may collect the parameters from the patient over the phone and enter them on the patient's behalf.

In some examples, there may be cases where a prompt is not made for a patient to provide WLAN parameters. For example, there may be deployments where the WLAN parameters are provided when a subscription is made to patient monitoring service 120. In deployments where a shared WLAN is available, such as in a building with a plurality of residential units, an administrator may configure the WLAN parameters for all the controllers being deployed that have access to the shared WLAN. In another example, the patient may do things out of order and enter the WLAN parameters via portal 121's web interface even before installing their controller. In such cases, the controller can download WLAN parameters when it is first powered on by the patient. If the parameters work, such that the controller is able to use the preferred network connection, no prompting is necessary.

Regardless of if and how a prompt was made, the method continues with 560 where portal 121 receives WLAN parameters. Portal 121 stores the parameters in patient and device data 122 and then continues to 570 where it sends the parameters to the intended controller. If valid parameters have been made available to the controller for a network visible to the controller, then the controller is now able to successfully access the WLAN.

Figure 6:
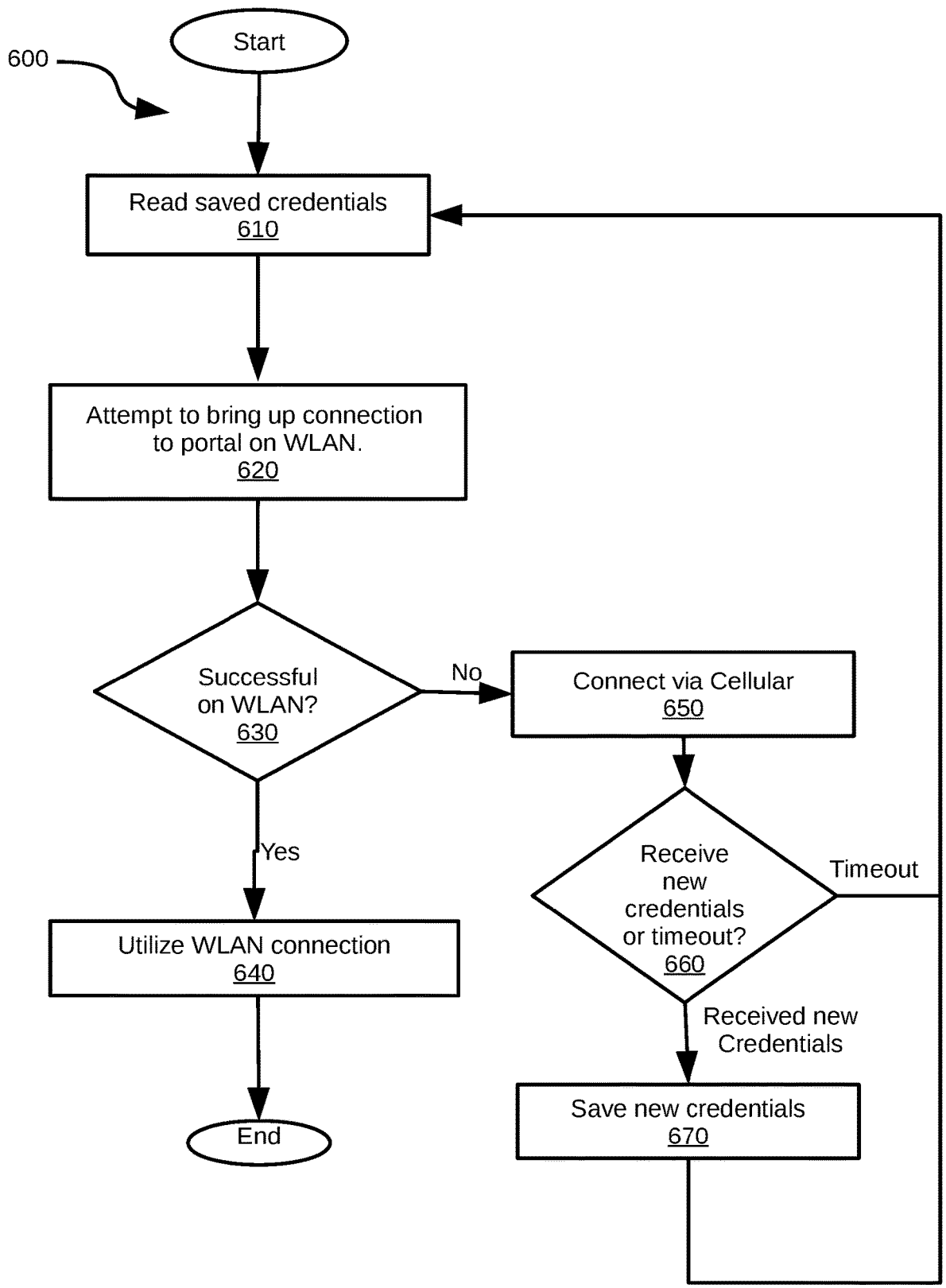
FIG. 6 is a flowchart illustrating an exemplary method for a controller bringing up a WLAN connection as the preferred network connection.

Turning now to FIG. 6 in which flowchart 600 illustrates an exemplary method for a controller bringing up a connection to a WLAN as a preferred network connection. This method may be executed by controllers having a Wireless LAN interface, such as example controllers 102 and 302 described earlier. While for clarity the following refers to controller 102 and its components when discussing the method, in other examples, similar actions could be performed by corresponding components of 302.

Starting at 610 controller manager 106 reads any WLAN parameters that have previously been locally saved on controller 102. The controller manager 106 uses them at 620 to attempt to access the WLAN. At 630 if the attempt to access the WLAN has been successful it continues on to 640 where it signals portal manager 108 to utilize the primary connection which is to the WLAN.

If, at 630, the attempt to use them was unsuccessful, the method continues to 650 where the controller manager 106 brings up the cellular data connection and then signals portal manager 108 to use the cellular data interface to connect to portal 121. Portal manager 108 sends any necessary controller identity, authentication and other registration information to portal 121 and then waits at 660 to receive WLAN parameters. Waiting at 660 can be configured to have a timeout. Should the timeout occur the method goes back to 610, which has the effect of retrying the already available WLAN parameters. Retry may be successful in cases, for example, where the WLAN was temporarily down. Otherwise, once it receives new parameters, at 670, it then saves the parameters in memory and goes back to 610, which has the effect of trying to connect to the WLAN with the newly saved parameters.

Figure 7:
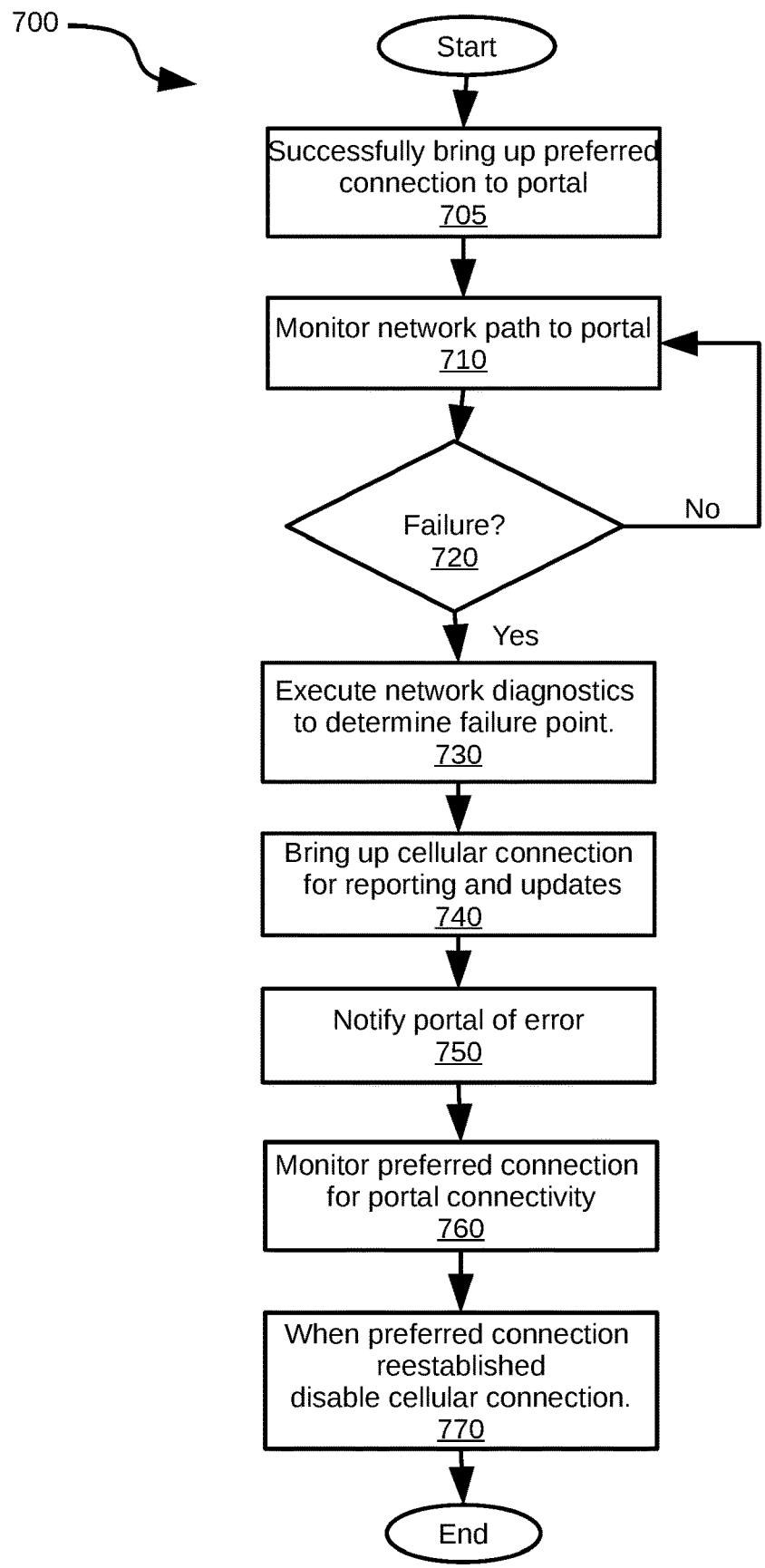
FIG. 7 is a flowchart illustrating an exemplary method for a controller reestablishing a preferred network connection

FIG. 7 is a flowchart illustrating an exemplary method 700 for a controller reestablishing a preferred network connection. This method may be executed by controllers having one or both of a Wired LAN interface and a Wireless LAN interface, such as example controllers 102, 202 and 302 described earlier. The following description of the method generally refers to controller 102 and its components, but it is to be understood that corresponding components of 202 or 302 could perform similar actions.

Starting at 705, a connection is successfully made by a controller to portal 121 using the controller's preferred network connection. For example, controller 102 uses Wireless LAN interface 112 and successfully connects to the local WLAN and then uses the WLAN connection to reach portal 121. In another example, controller 202 uses Wired LAN interface 211 to access the local LAN and uses the wired connection to reach portal 121. A controller such as 302 has both wired LAN 311 and wireless LAN 312 interfaces and may be configured to use either as a preferred network connection.

Having successfully connected to portal 121 using a preferred connection, the controller monitors the network path to portal 121 and at 720 continues to do so until, upon there being a failure, moving to 730 to determine the point of failure. The portal manager 108 executes network diagnostics at 730 to determine the point of failure as being the local network (wired or wireless, depending upon the capabilities of the controller), the internet connection or the portal itself. Network diagnostics may include, for example, a traceroute or ping to portal 121, verification that DNS is working, and other tests.

At 740, controller manager 106 activates the secondary cellular connection, allowing the portal manager to establish a connection to portal 121. The secondary cellular connection enables the controller to report errors and also to receive updates from portal 121. In some cases updated information, such as a new WLAN password, may resolve errors. At 750, portal manager 108 sends a notice of the error to portal 121. This notice may include traceroute information or other diagnostics that were used to isolate the source of the error. Upon receiving notice of the error, portal manager 121 can alert administrators, the patient or their caregiver so that appropriate corrective measures might be undergone. For example, if the WLAN is still visible but controller 102 can no longer access it, the WLAN password may have changed such that a new one needs to be collected and provided to controller 102. In other cases the WLAN may no longer visible at all to controller 102 or the WLAN may be up and accessible by controller 102, but traffic is not flowing to/from the internet to router 117.

At 760, controller manager 106 monitors for the establishment of the portal connection on the preferred connection. When it is reestablished the method continues at 770 and controller manager 106 disables the secondary cellular connection since it is undesirable to incur the expense of its use when the preferred connection is operational.

It should be appreciated that the actions illustrated in FIGS. 4-7 provide particular methods according to some example embodiments. Other sequences of actions may also be performed according to alternative embodiments. For example, alternative embodiments may perform the steps outlined above in a different order. Moreover, the individual steps illustrated in FIGS. 4-7 may include multiple sub-steps that may be performed in various sequences. Furthermore, additional steps may be added or removed depending on the particular application.

It should be appreciated that some example embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
receiving, at a portal, biometric information generated by a controller device for each biometric device that is to be controlled by the controller device, wherein the biometric information comprises activation information indicating that a corresponding biometric device has been activated by the controller device and/or biometric readings from the corresponding biometric device;
determining, at the portal, whether each biometric device associated with the controller device has been activated based on the received biometric information;
receiving, at the portal, wireless local area network (WLAN) parameters for connecting the controller device to a WLAN in response to determining that each biometric device associated with the controller device has been activated, wherein the WLAN parameters include at least one of a service set identifier (SSID) and a password; and
causing the WLAN parameters to be provided to the controller device using a cellular network to enable the controller device to communicate with the portal using the WLAN.

2. The method of claim 1, further comprising receiving, at the portal, a configuration request from the controller device for the WLAN parameters prior to providing the WLAN parameters to the controller device, wherein the configuration request includes information identifying the controller device.

3. The method of claim 1, receiving, at the portal, the WLAN parameters for the controller device via a web interface.

4. The method of claim 1 further comprising:
comparing, at the portal, the biometric information for each biometric device to a list of biometric devices associated with the controller device; and
recording, at the portal, each biometric device that has been activated in response to determining that the controller device has been activated.

5. The method of claim 4, further comprising providing, at the portal, a prompt comprising the WLAN parameters and causing the prompt to be provided to the controller device using the cellular network in response to determining that each biometric device that the controller device is to control has been activated.

6. The method of claim 5, the method further comprising:
receiving, at the portal, from the controller device, the SSID of one or more WLANs detectable by the controller device; and
using, at the portal, the SSID of the one or more WLANs to provide the prompt comprising the WLAN parameters.

7. A method comprising:
establishing, at a controller device, a connection with a cellular network to enable the controller device to communicate with a portal located at a remote location;
receiving, at the controller device, via the cellular network a list of biometric devices for the controller device from the portal;
determining, at the controller device, whether each biometric device associated with the controller device has been activated based on the list of biometric devices for the controller device; and
receiving, at the controller device, wireless local area network (WLAN) parameters for connecting the controller device to a WLAN in response to determining that each biometric device associated with the controller device has been activated, wherein the WLAN parameters comprise at least one of a WLAN service set identifier (SSID) and a WLAN password;
establishing, at the controller device, a connection with the WLAN based on the WLAN parameters to enable the controller device to communicate with the portal using the WLAN; and
terminating, at the controller device, the established connection with the cellular network to disable the controller device from communicating with the portal using the cellular network in response to establishing the connection with the WLAN.

8. The method of claim 7, further comprising:
prompting, at the controller device, a user to activate one or more biometric devices; and
receiving, at the controller device, biometric readings from one or more biometric devices; and
causing, at the controller device, the biometric readings to be provided to the portal via the cellular network.

9. The method of claim 7, further comprising
prompting, at the controller device, a user to provide the WLAN parameters prior to the controller device receiving the WLAN parameters; and
employing, at the controller device, the WLAN parameters provided by the user to establish the connection with the WLAN.

10. A method comprising:
establishing, at a controller device, a connection with a wireless local area network (WLAN) to enable the controller device to communicate with a portal located at a remote location, wherein the connection is established with the WLAN based on WLAN parameters received by the controller device from the portal using a cellular network in response to the controller device determining that each biometric device associated with the controller device has been activated based on a list of biometric device for the controller device provided by the portal;
monitoring, at the controller device, the connection with the WLAN for a network path error corresponding to a failure in the connection with the WLAN;
establishing, at the controller device, a connection with the cellular network in response to detecting the network path error to enable the controller device to communicate with the portal using the cellular network;
reporting, at the controller device, the network path error to the portal using the cellular network;
monitoring, at the controller device, the connection with the WLAN for reestablishment of the connection with the WLAN corresponding to a removal of the failure in the connection with the WLAN; and
terminating, at the controller device, the connection with the cellular network to disable the controller device from communicating with the portal using the cellular network in response to reestablishing the connection with the WLAN.

11. The method of claim 10, further comprising:
receiving, at the controller device, updated WLAN parameters from the portal using the cellular network, wherein the updated parameters comprise at least one of an updated service set identifier (SSID) and an updated password; and attempting, at the controller device, to reestablish the connection with the WLAN based on the updated WLAN parameters.

12. The method of claim 10, further comprising:
collecting, at the controller device, information characterizing the network path error for determining a point of failure; and
providing, at the controller device, the information to the portal using the cellular network.

13. The method of claim 1, wherein the determining comprises evaluating, at the portal, the received biometric information relative to biometric device information identifying each biometric device that has been associated with the controller device.

14. The method of claim 1, wherein the controller device is disabled from communicating with the portal using the cellular network in response to enabling the controller device to communicate with the portal using the WLAN.

15. The method of claim 1, wherein the controller device includes a cellular data interface configured to connect the controller device to the cellular network and the controller device is to enable the cellular data interface to communicate with the portal to receive the WLAN parameters from the cellular network.

16. The method of claim 15, wherein the controller device further includes a WLAN interface for connecting the controller device to the WLAN and is configured to establish a connection with the WLAN to enable the controller device to communicate with the portal using the WLAN based on the WLAN parameters.

17. The method of claim 16, wherein the controller device disables the cellular data interface in response to establishing a successful connection with the WLAN to prevent the controller device from communicating with the portal using the cellular network.

18. The method of claim 1, wherein the controller device is provisioned with a DNS name of the portal to enable the controller device to dynamically determine an IP address for the portal for communicating the WLAN parameters using the cellular network.

19. The method of claim 1, wherein the portal forms part of a patient monitoring service.

20. The method of claim 19, wherein the patient monitoring service is implemented in a cloud computing environment.

21. The method of claim 1, wherein the portal includes a database including a list of biometric devices for the controller device, and the portal is to determine whether each biometric device associated with the controller device has been activated further based on the list of biometric devices for the controller device.

22. The method of claim 21, further comprising prompting a user for the WLAN parameters in response to determining that each biometric device associated with the controller device has been activated based on the list of biometric devices for the controller device and the biometric information.

23. The method of claim 22, wherein the prompting of the user for the WLAN parameters is accomplished by one of the controller device and the portal.

24. The method of claim 22, wherein the biometric information further comprises the list of biometric devices for the controller device, and the method further comprises storing the list of biometric devices for the controller device in the database.

25. The method of claim 7, further comprising:
prompting a user for the WLAN parameters in response to determining that each biometric device associated with the controller device has been activated.

26. The method of claim 25, wherein the prompting of the user for the WLAN parameters is accomplished by one of the controller device and the portal.

* * * * *